United States Patent

Oshibe et al.

Patent Number: 5,244,935
Date of Patent: Sep. 14, 1993

[54] COMPOSITION OF ULTRAVIOLET CURING ANTIFOGGING AGENT AND PROCESS FOR FORMING ANTIFOGGING COATING FILM

[75] Inventors: Yoshihiro Oshibe; Yasuhiro Yamamoto; Hiroshi Ohmura; Keiji Kumazawa, all of Aichi, Japan

[73] Assignee: Nippon Oil and Fats Co., Ltd., Tokyo, Japan

[21] Appl. No.: 924,363

[22] Filed: Jul. 31, 1992

Related U.S. Application Data

[63] Continuation of Ser. No. 661,925, Feb. 26, 1991, abandoned.

[30] Foreign Application Priority Data

Feb. 26, 1990 [JP] Japan .................................. 2-46930
Mar. 1, 1990 [JP] Japan .................................. 2-51548
Jan. 28, 1991 [JP] Japan .................................. 3-8742

[51] Int. Cl.$^5$ .............................................. C08J 3/28
[52] U.S. Cl. ........................................ 522/151; 522/8; 522/33; 522/37; 522/121; 525/88
[58] Field of Search ............... 522/121, 151, 8, 33, 522/37; 525/88

[56] References Cited

U.S. PATENT DOCUMENTS

| | | | |
|---|---|---|---|
| 2,940,952 | 6/1960 | Miller | 522/4 |
| 4,400,460 | 8/1983 | Fickes et al. | 522/121 |
| 4,474,868 | 10/1984 | Yamaoka et al. | 522/121 |
| 4,604,425 | 8/1986 | Ohmura et al. | 525/88 |
| 5,180,760 | 1/1993 | Oshibe et al. | 523/169 |

FOREIGN PATENT DOCUMENTS

52-47754 12/1977 Japan .
53-23272 7/1978 Japan .
61-76563 4/1986 Japan .
61-118413 6/1986 Japan .
63-172778 7/1988 Japan .

*Primary Examiner*—Marion E. McCamish
*Assistant Examiner*—Mark A. Chapman

*Attorney, Agent, or Firm*—Reinhart, Boerner, Van Deuren, Norris & Rieselbach

[57] ABSTRACT

An ultraviolet curing antifogging agent is disclosed. The composition includes block copolymer (a) having a hydrophilic polymer segment (a1) and a hydrophobic polymer segment (a2). A polar solvent (c) is provided in which the hydrophilic polymer segment (a1) can easily be dissolved while the hydrophobic polymer segment (a2) can not. It further includes a photopolymerizable compound (b), and a photopolymerization initiator (d). The block copolymer (a) contains at least one hydrophilic monomer selected from the group of: a (meth)acrylamide compound represented by the general formula: $CH_2=CR_1CONR_2R_3$; a cyclic (meth)acrylamide compound represented by the general formula

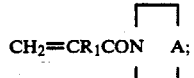

and a hydroxyalkyl (meth)acrylate. Further, the hydrophilic polymer segment (a1) is formed by a radically polymerizable monomer having a functional group such as glycidyl group. The hydrophobic polymer segment (a2) is formed by a radically polymerizable monomer and a hydrophobic monomer which is copolymerizable with the former radically polymerizable monomer. The weight ratio of the hydrophilic polymer segment (a1) to the hydrophobic polymer segment (a2) is 50/50 to 95/5. The photopolymerizable compound (b) can be represented by the general formula $CH_2=CR_1COO(CH_2CR_4HO)_nOCCR_1=CH_2$. The weight ratio of the component (a) to the component (b) is in the range of 10/90 to 90/10 in terms of the solid content. Such compositions have excellent antifogging properties and can be applied to transparent plastic materials to prevent fogging.

5 Claims, No Drawings

COMPOSITION OF ULTRAVIOLET CURING ANTIFOGGING AGENT AND PROCESS FOR FORMING ANTIFOGGING COATING FILM

This is a continuation of copending application Ser. No. 07/661,925 filed on Feb. 26, 1991, now abandoned.

BACKGROUND OF THE INVENTION

This application claims the priority of Japanese Patent Application Nos. 2-46930 filed Feb. 26, 1990, and 2-51548 filed Mar. 1, 1990 which are incorporated herein by reference.

FIELD OF THE INVENTION

This invention relates to a composition of ultraviolet curing antifogging agent for imparting antifogging properties to various plastic molding materials, films, etc. and to a process for forming an antifogging coating film using the same.

DESCRIPTION OF THE RELATED ART

Various types of transparent plastic materials are used for swimming goggles, helmet shields, covers for measuring instruments, lenses, windowpanes for houses and vehicles, etc.

These plastic materials suffer a problem in that when they are used in a high temperature and high humidity atmosphere or in an environment where there is a great difference between the temperature on the inner surface and that on the outer surface of the material, so-called fogging or vapor condensation occurs to form fine dew drops on the surface of the material.

In order to solve this problem it has been proposed to apply an antifogging agent on the surface of the material, and studies have been made on antifogging agents which can be cured by irradiation of an ultraviolet ray. For example, Japanese Patent Publication No. 52-47754 discloses an antifogging coating film formed by hydroxyethyl methacrylate and polyethylene glycol diacrylate. Japanese Patent Publication No. 53-23272 discloses a composition of antifogging agent comprising hydroxyethyl methacrylate, a crosslinking agent having two or more ethylenically unsaturated double bonds and ammonium dichromate. Japanese Unexamined Patent Publication No. 61-76563 discloses an antifogging coating agent comprising a polyfunctional (meth)acrylate, a phosphate monomer, a colloidal silica and acrylic acid ester of glycerol glycidyl ether.

Further, Japanese Unexamined Patent Publication No. 61-118413 discloses an antifogging composition comprising an adduct of alkylhydantoin bisepoxide with (meth)acrylic acid, a (meth)acrylic acid ester having an ethylene oxide chain and a quaternary ammonium salt of (meth)acrylic acid. Japanese Unexamined Patent Publication No. 63-172778 also discloses an antifogging coating agent comprising an acrylic graft polymer, a photopolymerizable polyacrylate and carboxylic acid.

The above ultraviolet curing coating agents can form cured films by brief irradiation and thus enjoy excellent productivity. However, they suffer the problem that their antifogging properties, film strength and adhesion cannot be improved in a desired balance.

Meanwhile, U.S. patent application Ser. No. 341,709, filed on Apr. 21, 1989 proposes an antifogging film forming composition comprising a block copolymer or graft copolymer having a hydrophilic polymer segment and a hydrophobic polymer segment having incorporated therein a surfactant. However, since the disclosed composition is a heat curing type, the films must be subjected to heat treatment at a high temperature or for an extended time, requiring considerable time for film formation.

SUMMARY OF THE INVENTION

This invention has been accomplished with a view to solving the above problems. It is an object of this invention to provide a composition of ultraviolet curing antifogging agent which can not only afford excellent antifogging properties, film strength, adhesion and film appearance but also can readily form coating films. Another object is to provide a process of forming an antifogging coating film using such a composition. In order to achieve the intended object, the composition of antifogging agent according to this invention contains a block copolymer (a) having a hydrophilic polymer segment (a1) and a hydrophobic polymer segment (a2). It also contains a photopolymerizable compound (b) and a photopolymerization initiator (d). A polar solvent (c) is provided in which the hydrophilic polymer segment (a1) can easily be dissolved rather than the hydrophobic polymer segment (a2).

The hydrophilic polymer segment (a1) of the block copolymer contains 70 to 99% by weight of at least one hydrophilic monomer selected from the group consisting of:

1) a (meth)acrylamide compound represented by the general formula (I):

$$CH_2=CR_1CONR_2R_3 \qquad (I)$$

wherein $R_1$ represents a hydrogen atom or a methyl group; $R_2$ represents a hydrogen atom or a linear or branched $C_nH_{2n+1}$; $R_3$ represents a hydrogen atom, a linear or branched $C_nH_{2n+1}$, N,N-dimethylaminopropyl group or $-C(CH_3)_2CH_2COCH_3$; and n is an integer in the range of 1 to 4;

2) a cyclic (meth)acrylamide compound represented by the general formula (II):

wherein $R_1$ represents a hydrogen atom or a methyl group; and A represents $-(CH_2)_4-$, $-(CH_2)_5-$ or $-(CH_2)_2-O-(CH_2)_2-$; and 3) a hydroxyalkyl (meth)acrylate.

The hydrophilic polymer segment (a1) also includes 1 to 30% by weight of at least one monomer selected from the group of radically polymerizable monomers having a functional group such as glycidyl group, amino group, carboxyl group, sulfonic group or acid anhydride group.

The hydrophobic polymer segment (a2) includes 1 to 30% by weight of the monomer selected from the above group of radically polymerizable monomers and 70 to 99% by weight of at least one hydrophobic monomer which can be copolymerized with the selected radically polymerizable monomer.

The weight ratio of the hydrophilic polymer segment (a1) to the hydrophobic polymer segment (a2) is in the range of 50/50 to 95/5.

The photopolymerizable compound (b) can be represented by either of general formulas (III) and (IV) or by a mixture of the two compounds. The general formula (III) is as follows:

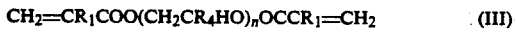

$$CH_2=CR_1COO(CH_2CR_4HO)_nOCCR_1=CH_2 \quad (III)$$

wherein $R_1$ and $R_4$ each represent a hydrogen atom or a methyl group; and n is an integer in the range of 1 to 30.

General formula (IV) is:

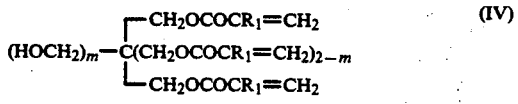

$$(HOCH_2)_m-C\begin{matrix}-CH_2OCOCR_1=CH_2\\-C(CH_2OCOCR_1=CH_2)_{2-m}\\-CH_2OCOCR_1=CH_2\end{matrix} \quad (IV)$$

wherein $R_1$ represents a hydrogen atom or a methyl group; and m is 0, 1 or 2.

The weight ratio of the component (a) to the component (b) is 10/90 to 90/10 in terms of the solid content.

DETAILED DESCRIPTION OF THE INVENTION

The composition of antifogging agent according to this invention contains a block copolymer (a) having a hydrophilic polymer segment (a1) and a hydrophobic polymer segment (a2). The present composition further contains a photopolymerizable compound (b), a polar solvent (c) in which the hydrophilic polymer segment (a1) can easily be dissolved rather than the hydrophobic polymer segment (a2), and a photopolymerization initiator (d).

The block copolymer (a) according to this invention consists of a hydrophilic polymer segment (a1) and a hydrophobic polymer segment (a2). The hydrophilic polymer segment exhibits excellent antifogging properties, whereas the hydrophobic polymer segment provides excellent film strength and adhesion. A well-balanced ratio of the hydrophilic polymer segment to the hydrophobic polymer segment gives excellent film appearance.

It is essential that the hydrophilic polymer segment (a1) consists of 70 to 99% by weight of at least one monomer selected from the group consisting of (meth)acrylamide compounds represented by the general formula (I), cyclic (meth)acrylamide compounds represented by the general formula (II) and hydroxyalkyl (meth)acrylates.

Such monomers can be exemplified by (meth)acrylamide, N-methyl (meth)acrylamide, N,N-dimethyl (meth)acrylamide, N-ethyl (meth)acrylamide, N,N-diethyl (meth)acrylamide, N-n-propyl (meth)acrylamide, N-isopropyl (meth)acrylamide, diacetone (meth)acrylamide, N-(meth)acryloylpiperidine, N-(meth)acryloyl-morpholine, hydroxethyl (meth)acrylate and hydroxypropyl (meth)acrylate.

The reason why such monomers are used as essential constituents of the hydrophilic polymer segment (a1) is because these monomers have well-balanced antifogging properties and film strength. The ratio of the two monomers (hydrophilic monomer and radically polymerizable monomer) in the hydrophilic polymer segment (a1) can suitably be decided taking such balance into consideration. If the amount of the hydrophilic monomer is less than 70% by weight, the antifogging properties can be exhibited insufficiently; whereas if it is more than 99% by weight, transparency of the antifogging film will be affected.

Meanwhile, the radically polymerizable monomer for forming the hydrophilic polymer segment (a1) is used in an amount of 1 to 30% by weight. This monomer is necessary to impart excellent transparency to the antifogging film. The reason why transparency can be imparted is believed to be because the size of the phase separation domains formed by the hydrophilic segments and the hydrophobic segments can be reduced to the order of microns under the electrostatic interaction at the interface of these segments or the interaction between the acid and base.

The radically polymerizable monomer may be exemplified by glycidyl (meth)acrylate, (meth)acrylic acid, N,N-dimethylaminopropyl (meth)acrylamide, N,N-dimethylaminoethyl (meth)acrylate, crotonic acid, itaconic acid, itaconic acid half ester, maleic acid half ester and maleic acid. If the amount of the radically polymerizable monomer is less than 1% by weight, transparency of the resulting coating film will be reduced; wheres if it is more than 30% by weight, the film shows only a low level of antifogging properties.

The hydrophobic polymer segment (a2) of the block copolymer serves to impart transparency and strength to the antifogging coating film, and improve adhesion of the film to the base materials. This hydrophobic polymer segment consists of 1 to 30% by weight of the radically polymerizable monomer and 70 to 99% by weight of the hydrophobic monomer which is copolymerizable with the former monomer.

The radically polymerizable monomer is preferably selected from those which can form an electrostatic bond, acid/base bond or covalent bond with the functional group introduced to the hydrophilic polymer segment. For example, when a glycidyl group or an amino group is present in the hydrophilic polymer segment, it is preferred that a carboxyl group or an acid anhydride group is present in the hydrophobic polymer segment.

The hydrophobic monomers which are copolymerizable with the radically polymerizable monomers can be exemplified by (meth)acrylates such as methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, 2-ethylhexyl (meth)acrylate, octyl (meth)acrylate, lauryl (meth)acrylate and stearyl (meth)acrylate; aromatic vinyl monomers such as styrene, vinyl toluene and α-methylstyrene; vinyl carboxylates such as vinyl formate, vinyl acetate, vinyl propionate and vinyl stearate; and butadiene, vinyl chloride, vinylidene chloride and (meth)acrylonitrile.

If the amount of such radically polymerizable monomer in the hydrophobic polymer segment is less than 1% by weight, transparency of the resulting coating film will be reduced. If it is more than 30% by weight, adhesion of the film to the base material will be lowered.

The weight ratio of the hydrophilic polymer segment (a1) to the hydrophobic polymer segment (a2) of the present block copolymer (a) is in the range of 50/50 to 95/5. If the amount of the hydrophilic polymer segment is less than 50% by weight, antifogging properties may not be exhibited; whereas if it is more than 95% by weight, strength and adhesion of the resulting film will be impaired.

The block copolymer can be synthesized by any known procedure. Particularly, in view of feasibility in industrial production and various performances, those which are synthesized by radical polymerization using a polymeric peroxide or a polyazo compound as a polymerization initiator are preferred. The polymerization may be accomplished by any of ordinary bulk polymerization, suspension polymerization, solution polymerization and emulsion polymerization.

The block copolymer according to this invention can typically be prepared by using a polymeric peroxide as an initiator, wherein a monomer for forming the hydrophilic polymer segment is first polymerized using the polymeric peroxide. Peroxy bonds are introduced into the molecular chain to provide a peroxy bond containing hydrophilic polymer. Subsequently, a monomer for forming the hydrophobic polymer segment is added to the above polymer product to effect polymerization therewith. This severs the peroxy bonds in the hydrophilic polymeric chain to give a block copolymer efficiently. The hydrophilic polymer segment and the hydrophobic polymer segment of the thus obtained block copolymer can arbitrarily be controlled in their molecular weights.

Next, the photopolymerizable compound (b) will be described. The photopolymerizable compound is used to improve the film strength by quickly forming a reticular structure in the internal portion of the coating film. This is accomplished by irradiation of ultraviolet rays while the orientational state of the block copolymer formed by heat drying is maintained. The photopolymerizable compound also allows the resulting film to exhibit excellent antifogging properties.

The photopolymerizable compound (b) can be represented by the general formula (III):

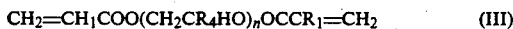

$$CH_2=CH_1COO(CH_2CR_4HO)_nOCCR_1=CH_2 \quad (III)$$

wherein $R_1$ and $R_4$ each represent a hydrogen atom or a methyl group; and n is an integer in the range of 1 to 30.

In the case of the compound (b) wherein n is 0, antifogging properties are not exhibited. In the case where n is greater than 30, film strength will be lowered. This photopolymerizable compound preferably is the component represented by the above general formula (III) or a mixture of this component with the photopolymerizable compound represented by the general formula (IV).

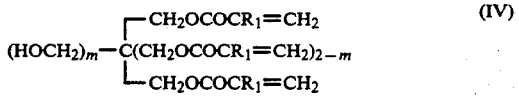

$$(HOCH_2)_m-C \begin{cases} CH_2OCOCR_1=CH_2 \\ (CH_2OCOCR_1=CH_2)_{2-m} \\ CH_2OCOCR_1=CH_2 \end{cases} \quad (IV)$$

wherein $R_1$ represents a hydrogen atom or a methyl group; and m is one of the integers 0, 1 or 2.

When the photopolymerizable compound consists only of the compound represented by the general formula (IV), a reticular structure can be formed with high density in the coating film, exhibiting excellent abrasion resistance. Moreover, a surfactant of component (e) (to be described later) contained in the reticular structure gradually migrates onto the film surface under the interaction with the hydrophilic polymer segment of the block copolymer, to allow the antifogging properties to be exhibited for an extended period.

Alternatively, when the photopolymerizable compound consists of a mixture of the compound of the general formula (III) and the compound of the general formula (IV), the abrasion resistance due will increase as the portion of the compound represented by the general formula (IV) is increased. Further, the film's antifogging properties will improve as the content of the compound represented by the general formula (III) is increased. In view of this relationship, the suitable mixing ratio of the compound (III) to the compound (IV) may be decided based on the application.

Now, referring to the polar solvent (c), the polar solvent migrates from the internal portion of the film to the surface and finally escapes from the film during the heat drying process. The hydrophobic polymer segment and the hydrophilic polymer segment of the block copolymer are oriented to the base material side and to the film surface side, respectively, at high densities. In order to allow the solvent to exhibit sufficiently the above function, it is essential to select a solvent in which the hydrophilic polymer segment can easily be dissolved rather than the hydrophobic polymer segment.

Such polar solvents can be exemplified by alcoholic solvents such as methanol, ethanol, n-propanol, isopropanol, n-butanol and diacetone alcohol; alcohol ethereal solvents such as methyl cellosolve, ethyl cellosolve, butyl cellosolve, methyl carbitol, ethyl carbitol and butyl carbitol; amide solvents such as formamide and dimethylformamide; nitrile solvents such as acetonitrile and acetylnitrile. Particularly preferred are alcohol ethereal solvents such as methyl cellosolve, ethyl cellosolve and butyl cellosolve.

Now, referring to the photopolymerization initiator (d), the following compounds can be used as polymerization initiators when the above photopolymerizable compounds are cured by an ultraviolet ray: benzoin or benzoin alkyl ethers such as benzoin methyl ether, benzoin ethyl ether and benzoin isopropyl ether; aromatic ketones such as benzophenone and benzoylbenzoic acid; α-dicarbonyls such as benzyl; benzyl ketals such as benzyl dimethyl ketal and benzyl diethyl ketal; acetophenones such as acetophenone, 1-(4-dodecylphenyl)-2-hydroxy-2-methyl-propan-1-one, 1-hydroxycyclohexylphenyl ketone, 2-hydroxy-2-methyl-1-phenyl-1-propane-1-one, 1-(4-isopropylphenyl)-2-hydroxy-2-methylpropan-1-one, 2-methyl-1-[4-(methylthio)-phenyl]-2-morpholinopropanone-1; anthraquinones such as 2-methylanthraquinone, 2-ethylanthraquinone and 2-t-butylanthraquinone; thioxanthones such as 2,4-dimethylthio-xanthone, 2-isopropylthioxanthone and 2,4-diisopropylthio-xanthone, α-acyloximes such as 1-phenyl-1, 2-propanedione-2-(o-ethoxycarbonyl)oxime and amines such as ethyl p-dimethyl-aminobenzoate and isoamyl p-dimethylaminobenzoate.

Particularly preferred of the above initiators are acetophenones such as 2-hydroxy-2-methyl-1-phenyl-1-propane-1-one; aromatic ketone such as benzophenone and benzyl ketal such as benzyl dimethyl ketal.

Now, referring to the surfactant (e), the surfactant migrates gradually from the internal portion of the film to the surface under the interaction with the hydrophilic polymer segment of the block copolymer. This improves hydrophilicity of the coating film coupled with the hydrophilic characteristic exhibited by the hydrophilic polymer segment of the block copolymer. Thus, the surfactant maintains the antifogging properties of the film over an extended period. Further, the surfactant improves leveling properties (smoothness) to improve film appearance.

For such reason, it is desired to incorporate the surfactant as necessary. Suitable surfactants can be selected from nonionic, anionic, cationic and ampholytic surfactant which are generally employed. However preferred are nonionic and anionic surfactants, particularly a combination of a nonionic surfactant and an anionic surfactant in order to allow the film to exhibit sustained antifogging properties for an extended period.

The surfactant preferably contains fluorine, and particularly preferably the surfactant is a fluorine containing surfactant whose hydrocarbon group (alkyl group) is substituted with a perfluoroalkyl group. The fluorine containing surfactant, because of its very high surface active performance, migrates to the portion adjacent to the film surface at a high concentration during the curing of the film by irradiation of an ultraviolet ray. The appropriate amount of this fluorine containing surfactant further improves leveling properties of the film surface to further improve film appearance. Incidentally, the behavior that the fluorine containing surfactant concentrated to the portion adjacent to the film surface during the film forming process migrates onto the film surface thereafter is supposed to be the same as in the cases of the ordinary surfactant.

Accordingly, even when a high-density reticular structure is formed by the photopolymerizable compound, excellent antifogging performance can be exhibited with high hardness. Moreover, excellent antifogging properties can be exhibited even at low temperatures.

The nonionic surfactant can be exemplified by, polyoxyethylene higher alcohol ethers such as polyoxyethylene lauryl alcohol, polyoxyethylene lauryl ether and polyoxyethylene oleyl ether; polyoxyethylene alkylaryl ethers such as polyoxyethylene octylphenol and polyoxyethylene nonylphenol; polyoxyethylene acyl esters such as polyoxyethylene glycol monostearate; fatty acid esters of polyoxyethylene sorbitan such as adduct of polypropylene glycol with ethylene oxide, polyoxyethylene sorbitan monolaurate and polyoxyethylene sorbitan monostearate; phosphates such as alkyl phosphates, phosphoric acid esters of polyoxyethylene alkyl ethers; sugar esters and cellulose ethers.

The anionic surfactant can be exemplified by fatty acid salts such as sodium oleate and potassium oleate; salts of higher alcohol sulfuric acid esters such as sodium lauryl sulfate and ammonium lauryl sulfate; alkylbenzenesulfonates or alkylnaphthalenesulfonates such as sodium dodecylbenzenesulfonate and sodium alkylnaphthalenesulfonates; salts of polyoxyethylene sulfates such as naphthalene-sulfonic acid/formalin condensation product, salts of dialkylsulfosuccinate, salts of dialkylphosphates and sodium sulfate of polyoxyethylenealkylphenyl ether.

The cationic surfactant can be exemplified by amine salts such as ethanolamine, lauryl aminoacetate, triethanolamine monoformic acid salt and stearamidoethyldiethylaminoacetic acid salt; and quaternary ammonium salts such as lauryltrimethylammonium chloride, stearyltrimethylammonium chloride, dilauryldimethylammonium chloride, distearyldimethylammonium chloride, lauryldimethylbenzylammonium chloride and stearyldimethylbenzylammonium chloride.

The ampholytic surfactant can be exemplified by fatty acid series ampholytic surfactant such as dimethylalkyllaurylbetaine and dimethylalkylstearylbetaine, sulfonic acid series ampholytic surfactant such as dimethylalkylsulfobetaine, and alkylglycine.

As the fluorine containing surfactant, any one nonionic, anionic, cationic and ampholytic surfactant can be used.

The nonionic fluorine containing surfactant can be exemplified by $C_pF_{2p+1}C_4O$ $(C_2H_4O)_qH$ (wherein p is an integer in the range of 6 to 12, and q is an integer in the range of 3 to 30); $C_pF_{2p+1}SO_2N(C_rH_{2r+1})(C_2H_4O)_qH$ (wherein p is an integer of 6 to 12, and q is an integer of 3 to 30, and r is an integer of 1 to 4); $CpF_{2p+1}SO_3H$ (wherein p is an integer of 6 to 12); $CpF_{2p+1}CO_2M$ (wherein p is an integer of 6 to 12); $CpF_{2p+1}SO_2N(C_rH_{2r+1})C_2H_4OSO_3H$ (wherein p is an integer of 6 to 12, and r is an integer of 1 to 4), $CpF_{2p+1}O—C_6H_4—CO_2(CH_2H_4O)_qRs$ (wherein p is an integer of 6 to 12, q is an integer of 3 to 30, and Rs represents an alkyl group having 1 to 16 carbon atoms, a phenyl group or an alkyl phenyl group substituted with an alkyl group having 1 to 16 carbon atoms); $CpF_{2p+1}O—C_6H_3—[CO_2(C_2H_4O)_qRs]_2$ (wherein p is an integer of 6 to 12, q is an integer of 3 to 30, Rs is an alkyl group having 1 to 16 carbon atoms, a phenyl group or an alkylphenyl group substituted with an alkyl group having 1 to 16 carbon atoms); and $C_pF_{2p+1}C_2H_4OCONHC_6H_4(CH_3)NHOCO(C_2H_4O)_qH$ (wherein p is an integer of 6 to 12, and q is an integer of 3 to 30).

Of these compounds, $C_pF_{2p+1}C_2H_4O(C_2H_4O)_qH$ (wherein p is an integer of 6 to 10, and q is an integer of 10 to 30); and $C_pF_{2p+1}SO_2N(C_rH_{2r+1})(C_2H_4O)_qH$ (wherein p is an integer of 6 to 10, q is an integer of 10 to 30, and r is an integer of 1 to 3) are particularly preferred.

The anionic fluorine containing surfactant can be exemplified by $C_pF_{2p+1}SO_3M$ (wherein p is an integer of 6 to 12, and M represents Li, Na, K, NH$_4$ or NH$_3$C$_2$H$_4$OH); $C_pF_{2p+1}CO_2M$ (wherein p is an integer of 6 to 12, and M represents Li, Na, K, NH$_4$ or NH$_3$C$_2$H$_4$OH); $C_pF_{2p+1}C_2H_4O(C_2H_4O)_qSO_3M$ (wherein p is an integer of 6 to 12, q is an integer of 3 to 30, and M represents Li, Na, K, NH$_4$ or NH$_3$C$_2$H$_4$OH), and all of them can suitably be employed.

The cationic fluorine containing surfactant can be exemplified by $C_pF_{2p+1}C_2H_4SC_2H_4CO_2C_2H_4N(C_rH_{2r+1})_3X$ (wherein p is an integer of 6 to 12, r is an integer of 1 to 4, and X represents I, Br or Cl); $C_pF_{2p+1}CONHC_rH_{2t}N(C_rH_{2r+1})_3X$ (wherein p is an integer of 6 to 12, r is an integer of 1 to 4, t is an integer of 1 to 5, and x represents I, Br or Cl); and $C_pF_{2p+1}SO_2NHC_rH_{2t}N(C_rH_{2r+1})_3X$ (wherein p is an integer of 6 to 12, r is an integer of 1 to 4, t is an integer of 1 to 5, and X represents I, Br or Cl).

The ampholytic fluorine containing surfactant can be exemplified by $C_pF_{2p+1}CONHC_rH_{2t}N(C_rH_{2r+1})_2C_2H_4CO_2$ (wherein p is an integer of 6 to 12, r is an integer of 1 to 4, and t is an integer of 1 to 5) or $C_pF_{2p+1}SO_2NHC_rH_{2t}N(C_rH_{2r+1})_2C_2H_4CO_2$ (wherein p is an integer of 6 to 12, r is an integer of 1 to 4, and t is an integer of 1 to 5).

Commercially available products can be used as the photopolymerizable compound (b), polar solvent (c), photopolymerization initiator (d) and surfactant (e), or they can be synthesized by known procedures.

Next, the ratio of components (a) to (e) will be described. In this invention, the ratio of the component (a) to the component (b) is in the range of 10/90 to 90/10. If the amount of the component (a) is less than 10 wt %, the resulting coating film comes to have low adhesion to the base material. If it is greater than 90 wt %, the film comes to have low crosslinking density which provides insufficient film strength.

When the photopolymerizable compound contains the component represented by the general formula (IV) [such photopolymerizable compound will hereinafter be represented by (b')], the weight ratio of the component (a): component (b'): component (e) is preferably in the range of 100:10 to 900:0.5 to 300. If the amount of the component (b') is less than 10 parts, the resulting coating film comes to have too low crosslinking density and in turn insufficient film strength; whereas if it is greater than 900 parts, the proportion of the other components becomes relatively smaller, and the resulting film can show low performances such as in antifogging properties and adhesion. Meanwhile, if the amount of the component (d) is less than 0.5 parts, only a low level of antifogging properties can be exhibited, whereas if it is greater than 300 parts, the proportion of the other component becomes relatively smaller, and the resulting film can show low performances such as in film strength and adhesion.

It should be noted that if the proportion of the component (a) is less than the specified value, adhesion etc. of the film will be lowered; whereas if it is greater than the specified value, film strength etc. will be lowered. Thus, the proportion of the component (a) is determined depending on that of the components (b) and (c).

The proportion of the fluorine containing surfactant contained in the surfactant (e) is preferably not less than 10 wt %, more preferably not less than 10 wt %, more preferably in the range of 10 to 80 wt %. If the amount of the fluorine containing surfactant is less than 10 wt %, its specific effect as described above may not sufficiently be exhibited. Further, in view of the film appearance including leveling properties, the surfactant (e) preferably is a combination of the fluorine containing surfactant and a fluorine free surfactant.

The proportion of the component (d) is preferably such that the weight ratio of the component (d) to the component (b) may be in the range of 1 to 30/100. If the amount of the component (d) is less than 1 wt %, ultraviolet curing does not proceed sufficiently, and the film strength tends to be lowered. If it is greater than 30 wt %, the weathering resistance etc. of the film tend to be affected. Further, the proportion of the component (c) is preferably not less than 30 wt % in order to facilitate orientation of the component (a) and in view of pot life (time until gellation occurs) and coating properties of the antifogging composition.

In order to enhance adhesion of the coating film to the base material, the present composition of ultraviolet curing antifogging agent may contain a vinyl monomer which is not copolymerizable with the radically polymerizable monomer, as necessary. However, if such vinyl monomer is incorporated in excess, the degree of reticulation to be achieved by the component (b) will be lowered to provide reduced film strength, so that the ultraviolet irradiation time must be increased. Accordingly, the amount of the vinyl monomer should appropriately be decided.

The process of forming an antifogging coating film on a base material will be described below. As the base material, transparent resins such as polycarbonate, polymethyl methacrylate and polyvinyl chloride or glass, which are used for swimming goggles, helmet shields, covers for measuring instruments, lenses or windowpanes for houses and vehicles can be used.

The composition of ultraviolet curing antifogging agent can generally be prepared by dissolving or suspending the components (a), (b), (d) and (e) in the polar solvent (c).

The thus prepared composition can be applied on the base material by conventional coating method for paints, such as roll coating, spray coating, dip coating, brushing, spin coating, etc.

The composition of antifogging agent is first applied onto a base material, and then the polar solvent contained therein is removed by heat drying, followed by irradiation of an ultraviolet ray to effect curing of the coating film. The thickness of the film is preferably 1 to 30 microns, more preferably 3 to 20 microns. If the thickness is less than 1 micron, the antifogging properties intend to be decreased. If the thickness is more than 30 microns, the leveling properties intend to be decreased and the appearances of the film intend to be impaired.

The above heat drying treatment is inevitable in order to achieve orientation of the hydrophilic polymer segment of the block copolymer (a) to the base material side and the hydrophobic polymer segment to the film surface side at high concentrations, respectively, when the polar solvent leaves from the film to give well balanced adhesion and hydrophilicity. The heating and drying conditions for removing the polar solvent can suitably be decided taking into consideration the evaporation speed of the solvent and the heat resistance of the base material. The heat treatment can be carried out at a temperature in the range of 50 to 80 in centigrade degree for about 20 seconds to 3 minutes depending on the kind of solvent.

Further, in order to form a cured film speedily, ultraviolet irradiation is required. As a source of ultraviolet irradiation, a low-pressure mercury lamp, a medium-pressure mercury lamp, a high-pressure mercury lamp, a xenon lamp or a metal halide lamp may preferably be used.

DESCRIPTION OF THE SPECIFIC EXAMPLES

This invention will now be described specifically by way of Examples and compared with Comparative Examples. In the following description the proportion (parts) of each compound are based on the weight.

SYNTHESIS EXAMPLES 1 TO 12

Synthesis of Block copolymer

Initially, the synthesis of each copolymer will be described. A block copolymer was synthesized through two-step polymerization using a polymeric peroxide as a polymerization initiator. In the first polymerization step, the hydrophilic polymer segment was formed, and in the second polymerization step, the hydrophobic polymer segment was formed. The polymerization conditions in each step were chosen in such a way that the charge monomers were polymerized almost completely.

To carry out the first step polymerization, 100 parts of methyl cellosolve was placed into a reactor equipped with a thermometer, a stirrer and a reflux condenser, and heated to 70 in centigrade degree with nitrogen gas blowing. A mixture of the following formulation was then added to the heated mixture over 2 hours to carry out polymerization for 2 hours:

|  | Part |
| --- | --- |
| Methyl cellosolve | A |
| [CO(CH$_2$)$_4$COO(CH$_2$H$_4$O)$_3$—CO(CH$_2$)$_4$COOO]$_{10}$ | B |
| Hydrophilic monomer | C |
| Radically polymerizable monomer | D |

Subsequently, in order to carry out the second step polymerization, a mixture of the following formulation:

|  | Part |
| --- | --- |
| Methyl cellosolve | E |
| Hydrophobic monomer | F |
| Radically polymerizable monomer | G | was further introduced to the reactor over 30 minutes to effect polymerization at 75° C.nfor 5 hours. Amount (in part) A to G and polymerization data are as shown in Tables 1 to 3.

SYNTHESIS EXAMPLES 13 TO 16

Synthesis of Random Copolymer

To the same reactor as used in Synthesis Example 1 was charged 100 parts of methyl cellosolve, and the system was heated to 85° C.nwith nitrogen gas blowing. To the heated methyl cellosolve was added a mixture of the following formulation:

|  | Part |
| --- | --- |
| Methyl cellosolve | A |
| t-Butyl peroxyoctanoate | B |
| Hydrophilic monomer | C |
| Hydrophobic monomer | D |
| Other monomer | E | over 2 hours to effect polymerization for 9 hours. The amounts (part) A to E and polymerization data are shown in Table 4.

Abbreviations used in Tables 1 to 4 stand for the following compounds:
DMAm: N,N-dimethylacrylamide
ACMO: N-acryloylmorpholine
IPAm: N-isopropylacrylamide
HEMA: 2-hydroxyethyl methacrylate
HEA: 2-hydroxyethyl acrylate
GMA: glycidyl methacrylate
SEM: 2-sulfoethyl methacrylate
MMA: methyl methacrylate
IBMA: isobutyl methacrylate
AA: acrylic acid.

The units of the items in the column "Result" are as follows:
Solid content: wt %
Viscosity: poise, measured at 25° C.
% Hydrophilic polymer: % of the polymer synthesized in the first polymerization step in the total amount of the polymer

TABLES 1 TO 4

Examples 1 to 11 and Comparative Examples 1 to 11st

To the polymer solutions obtained in Synthesis Examples 1 to 5 and 7 to 16 were added the compounds as shown in Tables 5 to 7. Each of the resulting mixtures was diluted with methyl cellosolve, in which the hydrophilic polymer segment of the block copolymer is easily soluble rather than the hydrophobic polymer segment thereof, so that the concentration of the components except for the solvent was 25 wt % to provide compositions of ultraviolet curing antifogging agent.

Subsequently, each composition was applied on various types of base materials using a bar coater so that the resulting coating film had a dry thickness of 5 μm and heat dried at 80° C. The dried film was then subjected to ultraviolet irradiation from the distance of 25 cm using a 80 W/cm high-pressure mercury lamp (manufactured by Japan Storage Battery Co., Ltd.) to obtain a cured film. Base materials, heat drying time (sec.) and ultraviolet irradiation time (sec.) are also shown in Tables 5 to 7.

In Tables 5 to 7, the parenthesized numbers and abbreviations stand for the following compounds:

SOLVENT

MC: Methyl cellosolve; MK: methyl ethyl ketone; TL: Toluene.

CROSSLINKING AGENT (PHOTOPOLYMERIZABLE COMPOUND)

(1): Polyethylene glycol diacrylate, NK ESTER 200, trade name, manufactured by Shin-Nakamura Kagaku Kogyo K.K.
(2): Polyethylene glycol diacrylate, NK ESTER 600, trade name, manufactured by Shin-Nakamura Kagaku Kogyo K.K.
(3): Polypropylene glycol diacrylate, NK ESTER APG 400, trade name, manufactured by Shin-Nakamura Kagaku Kogyo K.K.
(4): Polyethylene glycol dimethacrylate, NK ESTER 23G, trade name, manufactured by Shin-Nakamura Kagaku Kogyo K.K.
(5): Polypropylene glycol dimethacrylate, NK ESTER 9PG, trade name, manufactured by Shin-Nakamura Kagaku Kogyo K.K.
(6): Ethylene glycol dimethacrylate, SARTOMER SR 206, trade name, manufactured by SARTOMER Company.

SURFACTANT (a): Polyoxyethylene octylphenyl ether, NONION HS-210, trade name, manufactured by Nippon Oil and Fats Co., Ltd.
(b): Sodium dioctylsulfosuccinate, RAPISOL B-80, trade name, manufactured by Nippon Oil and Fats Co., Ltd.

PHOTOPOLYMERIZATION INITIATOR (7): 2-Hydroxy-2-methyl-1-phenylpropan-1-one, DYLOCURE 1173, manufactured by Merck Japan

BASE MATERIAL

PVC: Polyvinyl chloride; PC: Polycarbonate; PMMA: Polymethyl methacrylate,

TABLES 5 to 7

Coating films obtained in the above Examples and Comparative Examples were evaluated in their physical properties according to the following evaluation modes, and the results are shown in Tables 9 and 10.
(1) Film appearance Visual evaluation:
 ⊚: Transparent viewed from any angle ◯: Practically usable with no problem, although the transparency varies slightly depending on the view angles △: Slightly opacified to white and not suitable for practical uses ×: Opacified to white and practically unusable, (2) Film strength i) Pencil hardness test: (according to JIS K5400) The hardness of the coating layer is evaluated through following examination based on JIS K5400. 17 kinds of pencils, which are "UNI" produced by Mitsubishi Enpitsu K.K., are used in the examination. The hardness of the pencils are 17 levels including 9H,8H,7H,6H,5H,4H3H,2H, H, F, HB, B,2B,3B4B,5B and 6B. 9H is the hardest one and 6B is the softest one. Each pencil is attached to the scratching test machine to examine the hardness of the coating layer. Each pencil is moved on the coating layer by the velocity of 0.5 mm/sec under loading 1 Kg to the pencil.

The hardness of the coating layer is classified into two classes based on the hardness of the hardest pencil which cannot make scratches on the coating layer.

◯: The hardness of the coating layer corresponds to over 2H of the hardness of the pencil.

×: The hardness of the coating layer corresponds to less than 2H.

ii) Waterproofness: Appearance of the film after immersion in 60° C.nhot water for 100 hours was visually observed.

◯: No change in the film appearance

×: Change was observed in the film appearance, (3) Adhesion i) Initial adhesion prior to waterproofness test The coating film was cross-cut into 100 sections with a cutter knife in such a way that the edge of the knife may reach the base material, and an adhesive tape (manufactured by Nichiban Co., Ltd.) was adhered thereon. The tape was then peeled off in the direction perpendicular to the bond surface to count the number of crosscut square sections remained intact. The greater is the number of the intact sections, the higher will be the adhesion. The adhesion was evaluated according to the following criteria depending on the number of cross-cut sections:

(a): 100/100
(b): 90/100
(c): 80/100
(d): 70/100
(e): 60/100
(f): 50/100
(g): 20/100
(h): 10/100
(i): 8/100
(j): 7/100
(k): 5/100
(l): 0/100.

ii) Adhesion after waterproofness test

The adhesion test in i) was repeated after the coating film was immersed in a 60° C. hot water for 30 hours and left to stand for drying.

(4) Antifogging properties i) Antifogging test by exhalation prior to waterproofness test The coating film was exposed to exhalation in a thermostatic chamber of 20° C., and the fogging state was visually evaluated.

⊚: Free from fogging
◯: Vapor momentarily spreads
△: Fogging observed slightly
×: Fogging occurred over the entire film surface i) Antifogging test by exhalation after waterproofness test The coating film was immersed in a 30° C. water for 24 hours and left to stand for drying, and then the test in i) was repeated.

COMPARATIVE EXAMPLES 12 to 14

The methyl cellosolve was removed under reduced pressure from the polymer solutions synthesized in Synthesis Examples 3, 9 and 11 to collect the solid contents of the block copolymers respectively. The solid contents were mixed with the compounds as shown in Table 7, respectively. To each of the resulting mixtures was added methyl ethyl ketone or toluene in which the hydrophobic polymer segment can easily be dissolved rather than the hydrophilic polymer segment to provide a solution of the composition of ultraviolet curing antifogging agent. Subsequently, a cured film was formed and tested in the same manner as in Example 1, and the results are shown in Table 10.

COMPARATIVE EXAMPLES 15 to 20

To the polymer solutions synthesized in Synthesis Examples 2 and 3 was added paratoluenesulfonic acid which serves as a catalyst for heat curing in place of the crosslinking agent as used in Example 1 and optionally a surfactant, and then methyl cellosolve was further added thereto to provide compositions of heat-curing antifogging agent respectively. The amount of the surfactant added is as shown in Table 8, and the amount of the methyl cellosolve was adjusted so that the concentration of the components except for the solvent may be 25 wt %. Incidentally, description of the type of surfactant and their amounts are according to Examples 1 to 11.

Subsequently, each composition was applied on a polycarbonate plates using a bar coater so that the resulting coating film may have a dry thickness of 5 mm and heat cured under the conditions as shown in Table 8, followed by the same test as in Example 1. The results are shown in Table 11.

TABLES 8 TO 11

As apparent from Table 9, the antifogging coating films obtained from the compositions of ultraviolet curing antifogging agent of Examples 1 to 11 exhibit practically excellent film appearance if the kind and amount of the monomers in the hydrophilic polymer segment and hydrophobic polymer segment, that of photopolymerizable compound, that of polar solvent and that of photopolymerization initiator are varied within the scope of this invention. Further, these films have sufficient film strength and adhesion as well as excellent antifogging properties. Moreover, these antifogging coating films can be formed in a shorter time as compared with the conventional compositions of heat curing anti-fogging agent (Comparative Examples 15, 16, 19 and 20) which requires a curing time of 30 minutes or more.

Meanwhile, in the case of control compositions (Comparative Examples 1 to 7) in which the ratio of the hydrophilic polymer segment to the hydrophobic polymer segment in the block copolymer and the ratio of the block copolymer to the photopolymerizable compound are not within the scope of this invention, any of coating appearance, film strength, adhesion and antifogging properties will be lowered. When random copolymers are used (Comparative Examples 8 to 11), these performances are generally lowered. Further, when methyl ethyl ketone or toluene was used as a film-forming solvent in which the hydrophobic polymer segment of the block copolymer can easily be dissolved rather than the hydrophilic polymer segment thereof (Comparative Examples 12 to 14), film appearance, adhesion and antifogging properties will be lowered.

As has been described heretofore, the compositions of ultraviolet curing antifogging agent in Examples 1 to 11 can securely afford antifogging properties in the coating films even in the absence of surfactant, and contact of these films with current water or immersion thereof in warm water will not impair the antifogging properties. Accordingly, these compositions are desirable for imparting antifogging properties on the surface of swimming goggles, helmet shields, covers for measuring instruments and windowpanes of houses or vehicles.

EXAMPLES 12 TO 29 AND COMPARATIVE EXAMPLES 21 TO 34

To the polymer solutions synthesized in Synthesis Examples 1 to 16 were added the compounds as shown in Tables 12 to 15, respectively, and the resulting mixtures were diluted with methyl cellosolve, in which the hydrophilic polymer segment of the block copolymer can easily be dissolved rather than the hydrophobic polymer segment thereof, to provide compositions of ultraviolet curing antifogging agent, respectively; wherein the concentration of the components except for the solvent is 25 wt %.

Subsequently, the compositions were applied onto various kinds of base materials in the same manner as in Examples 1 to 11, followed by heat drying and ultraviolet irradiation to form antifogging coating films, respectively. The kind of base materials, heat drying time (sec.) and ultraviolet irradiation time (sec.) are also shown in Tables 12 to 15.

The abbreviations and parenthesized numbers used in Tables 12 to 15 stand for the following compounds:

SOLVENT

MC: Methyl cellosolve; MK: ethyl ethyl ketone; TL: Toluene.

CROSSLINKING AGENT (PHOTOPOLYMERIZABLE COMPOUND)

(1): Pentaerythritol triacrylate, NK ESTER A-TMM3, trade name, manufactured by Shin-Nakamura Kagaku Kogyo K.K.
(2): Pentaerythritol tetraacrylate, NK ESTER A-TMMT, trade name, manufactured by Shin-Nakamura Kagaku Kogyo K.K.
(3): Pentaerythritol tetramethacrylate, SARTOMER SR 367, trade name, manufactured by SARTOMER Company.
(4): Polypropylene glycol diacrylate, NK ESTER 200, trade name, manufactured by Shin-Nakamura Kagaku Kogyo K.K.
(5): Polyethylene glycol diacrylate, NK ESTER 600, trade name, manufactured by Shin-Nakamura Kagaku Kogyo K.K.
(6): Polypropylene glycol diacrylate, NK ESTER APG 400, trade name, manufactured by Shin-Nakamura Kagaku Kogyo K.K.
(7): Polyethylene glycol dimethacrylate, NK ESTER 23G, trade name, manufactured by Shin-Nakamura Kagaku Kogyo K.K.
(8): Polypropylene glycol dimethacrylate, NK ESTER 9PG, trade name, manufactured by Shin-Nakamura Kagaku Kogyo K.K.
(9): Ethylene glycol dimethacrylate, SARTOMER SR 206, trade name, manufactured by SARTOMER Company.

SURFACTANT (a): Polyoxyethylene nonylphenyl ether, NONION HS-212, trade name, manufactured by Nippon Oil and Fats Co., Ltd.
(b): Polyoxyethylene octylphenyl ether, NONION HS-210, trade name, manufactured by Nippon Oil and Fats Co., Ltd.
(c): Sodium dioctylsulfosuccinate, RAPISOL B-80, trade name, manufactured by Nippon Oil and Fats Co., Ltd.
(d): Dimethylalkyl(coconut)betaine, ANON BF, trade name, manufactured by Nippon Oil and Fats Co., Ltd.

PHOTOPOLYMERIZATION INITIATOR (1): 2-Hydroxy-2-methyl-1-phenylpropan-1-one, DYLOCURE 1173, manufactured by Merck Japan.

BASE MATERIAL

PVC: Polyvinyl chloride; PC: Polycarbonate; PMMA: Polymethyl methacrylate.

TABLES 12 to 15

The coating films obtained in the above Examples and Comparative Examples were evaluated in their physical properties according to the following evaluation modes, and the results are shown in Tables 16 and 19.

(1) Film appearance

Film appearance was evaluated in the same manner as in Examples 1 to 11.

(2) Film strength i) Pencil hardness test:

Pencil hardness was classified in the same manner as in Examples 1 to 11. However Evaluation was made according to the following criteria.

○: The hardness of the coating layer corresponds to over 3H of the hardness of the pencil.

×: The hardness of the coating layer corresponds to less than 3H.

ii) Color fastness to rubbing

Fastness of the coating film was tested using the test method of color fastness to rubbing according to JIS K 6328. Appearance of the film surface after completion of this test was visually observed to determine resistance of the film to rubbing. The rubbing test was carried out using a dry white cotton fabric web (Color fastness test 1) and also using white cotton fabric web wetted with distilled water (Color fastness test 2) to provide a condition where fogging is supposed to be easily induced, respectively. Evaluation was made according to the following criteria.

⊚: No change

○: The number of scratches formed on the film surface: <10.

Δ: The number of scratches formed on the film surface: 10 to 30

X: The number of scratches formed on the film surface: >30.

iii) Waterproofness

Waterproofness was tested in the same manner as in Examples 1 to 11.

(3) Adhesion i) Initial adhesion prior to waterproofness test Initial adhesion was tested in the same manner as in Examples 1 to 11. However, the adhesion was evaluated according to the following criteria depending on the number of cross-cut sections, this criteria is different from that in the Examples 1 to 11:

(a): 100/100
(b): 90/100
(c): 80/100
(d): 70/100
(e): 65/100
(f): 60/100
(g): 55/100
(h): 50/100
(i): 20/100
(j): 15/100
(k): 12/100
(l): 10/100
(m): 5/100
(n): 0/100 ii) Adhesion after waterproofness test

The test was carried out in the same manner as in Examples 1 to 11.

(4) Antifogging properties i) Antifogging test by exhalation prior to waterproofness test The test was carried out in the same manner as in Examples 1 to 11.

ii) Steam test (60° C.)

The coating films were exposed to 60° C. steam in a thermostatic chamber maintained at 20° C. to measure the time until fogging occurred.

iii) Antifogging test by exhalation after waterproofness test

The test was carried out in the same manner as in Examples 1 to 11.

COMPARATIVE EXAMPLES 35 to 37

The methyl cellosolve was removed under reduced pressure from the polymer solutions synthesized in Synthesis Examples 3, 9 and 11 to collect the solid contents of the block copolymers respectively. The solid contents were mixed with the compounds as shown in Table 15, respectively. To each of the resulting mixtures was added methyl ethyl ketone or toluene in which the hydrophobic polymer segment can easily be dissolved rather than the hydrophilic polymer segment to provide a solution of the composition of ultraviolet curing antifogging agent. Subsequently, a cured film was formed and tested in the same manner as in Example 1 to 11, and the results are as shown in Table 19.

TABLES 16 TO 19

As apparent from Tables 16 and 17, the compositions of Examples 12 to 29 can provide antifogging coating films having the similar characteristics to those obtained in Examples 1 to 11, even if the kind and amount of the monomers in the hydrophilic polymer segment and hydrophobic polymer segment in the block copolymer, that of photopolymerizable compound, that of polar solvent, that of surfactant and that of photopolymerizatoin initiator are varied within the scope of this invention.

Meanwhile, in the case of control compositions (Comparative Examples 21 to 30) in which the ratio of the hydrophilic polymer segment to the hydrophobic polymer segment in the block copolymer and the ratio of the block copolymer to the photopolymerizable compound are not within the scope of this invention, any of coating appearance, film strength, adhesion and antifogging properties will be lowered. When random copolymers are used (Comparative Examples 31 to 34), these performances are generally lowered. Further, when methyl ethyl ketone or toluene was used as a film-forming solvent in which the hydrophobic polymer segment of the block copolymer can easily be dissolved rather than the hydrophilic polymer segment thereof (Comparative Examples 35 to 37), film appearance, adhesion and antifogging properties will be lowered.

As has been described heretofore, the compositions of ultraviolet curing antifogging agent in Examples 12 to 29 can securely afford antifogging properties in the coating films if the films are brought into contact with current water or immersed in warm water. Accordingly, these compositions are desirable for imparting antifogging properties on the surface of swimming goggles, helmet shields, covers for measuring instruments and windowpanes of houses or vehicles.

EXAMPLES 30 TO 37 AND COMPARATIVE EXAMPLES 38 TO 40

To the polymer solutions synthesized in Synthesis Examples 2, 3, 11, 13, 14 and 16 were added the compounds as shown in Table 20 to prepare compositions of ultraviolet curing antifogging agent, followed by formation of antifogging coating films, in the same manner as in Examples 12 to 29. The kind of and amount of crosslinking agent and of fluorine free surfactant are indicated in Table 20 in the same manner as in Examples 12 to 29. The kind of photopolymerization initiator, heat drying time and ultraviolet irradiation time are also shown in the same manner as in Examples 12 to 29. The following compounds were used as the fluorine containing surfactant, the indication thereof in Table 20 are being made in the same manner as in the case of fluorine free surfactant.

(e) Adduct of perfluoroalkyl with ethylene oxide (molar number of the added EO=ca. 10), MEGAFAC F-142D, trade name, manufactured by Dainippon Ink & Chemicals, Inc.

(f) Adduct of perfluoroalkyl with ethylene oxide (molar number of the added EO=ca. 20), SERFON S-145, trade name, manufactured by Asahi Glass Co., Ltd.

(g) Potassium salt of perfluoroalkylcarboxylic acid, FLORAD FC-129, trade name, manufactured by Sumitomo 3M K.K.

(h) Ammonium salt of perflouroalkylsulfonic acid, FLORARD FC-93, trade name, manufactured by Sumitomo 3M K.K

TABLE 20

The coating films obtained in Examples 30 to 37 and Comparative Examples 38 to 40 were evaluated in their physical properties according to the following evaluation mode, and the results are shown in Table 21.

(1) Film appearance

Film appearance was evaluated according to the same criteria as used in Examples 12 to 29.

(2) Film strength
i) Pencil hardness test

Pencil hardness was tested before and immediately after the coating films were immersed in a 30° C. water in the same manner as in Examples 12 to 29 and evaluated according to the same criteria as used in Examples 12 to 29.

ii) Color fastness to rubbing and iii) Waterproofness

Tests were carried out in the same manner as in Examples 12 to 29 and evaluated according to the same criteria as used in Examples 12 to 29.

(3) Adhesion

Adhesion was tested in the same manner as in Examples 12 to 29 and evaluated according to the same criteria as in Examples 12 to 29.

(4) Antifogging properties
i) Exhalation exposure test at normal temperature

Test was carried out in the same manner as in Examples 12 to 29 and evaluated according to the same criteria as in Examples 12 to 29.

ii) Exhalation exposure test at low temperature

The coating films were exposed to exhalation in a thermostatic chamber maintained at 0° C. and a relative humidity of 80% to evaluate the state of fogging in the same manner as in i).

iii) Exhalation exposure test after waterproofness test

The coating films were immersed in a 30° C. water for 24 hours and left to stand for drying, followed by the exhalation test at normal temperature.

Table 21

As apparent from Table 21, when fluorine containing surfactant were incorporated in the compositions (Examples 31, 32, 34 and 35), the resulting antifogging coating films can show excellent performance even under low temperature conditions where exhibition of antifogging characteristics is supposed to be difficult. Moreover, the antifogging properties can be exhibited with no reduction in the extremely excellent hardness of the films (in the comparison between Example 30 and Examples 31 and 32, and between Example 36 and Example 37).

Meanwhile, it can be seen in the case of control compositions (Comparative Examples 38 to 40) in which random copolymers are used in place of the block copolymers, these performances are generally lowered. Accordingly, the compositions of ultraviolet curing antifogging agent according to this invention can suitably be applied to helmet shields and sky goggles which otherwise suffer fogging under low temperature conditions. Although several embodiments of the present invention have been described herein, it will be apparent to those skilled in the art that the present invention may be embodied in many other specific forms without departing from the spirit or scope of this invention.

TABLE 1

| Synthesis Example No. | 1 | 2 | 3 | 4 |
|---|---|---|---|---|
| Composition of charge solution | | | | |
| First step polymerization (part) | | | | |
| A | 36.0 | 36.0 | 36.0 | 36.0 |
| B | 4.0 | 4.0 | 4.0 | 4.0 |
| C | | | | |
| DMAm | 25.2 | — | 25.5 | — |
| ACMO | — | 31.5 | — | — |
| IPAm | — | — | — | 14.3 |
| HEMA | — | — | 25.5 | — |
| HEA | 10.8 | 13.5 | — | 42.7 |
| D | | | | |
| GMA | — | — | 9.0 | 3.0 |
| SEM | 24.0 | 15.0 | — | — |
| Composition of charge solution | | | | |
| Second step polymerization (part) | | | | |
| E | 46.7 | 46.7 | 46.7 | 46.7 |
| F | | | | |
| MMA | 17.0 | 17.0 | 17.0 | 17.0 |
| IBMA | — | — | — | — |
| G | 3.0 | 3.0 | 3.0 | 3.0 |
| AA | | | | |
| Polymerization data | | | | |
| Solid content | 31.5 | 31.0 | 31.5 | 30.3 |
| Viscosity | 4.5 | 4.0 | 3.5 | 3.0 |
| % Hydrophilic polymer | 75 | 75 | 75 | 75 |

TABLE 2

| Synthesis Example No. | 5 | 6 | 7 | 8 |
|---|---|---|---|---|
| Composition of charge solution | | | | |
| First step polymerization (part) | | | | |
| A | 36.0 | 36.0 | 36.0 | 36.0 |
| B | 4.0 | 4.0 | 4.0 | 4.0 |
| C | | | | |
| DMAm | 25.2 | 25.5 | — | 26.0 |
| ACMO | — | — | — | — |
| IPAm | — | — | — | — |
| HEMA | 25.5 | 25.5 | 60.0 | — |
| HEA | — | — | — | 25.0 |
| D | | | | |
| GMA | 9.0 | 9.0 | — | 9.0 |
| SEM | — | — | — | — |
| Composition of charge solution | | | | |
| Second step polymerization (part) | | | | |
| E | 46.7 | 46.7 | 46.7 | 4.4 |
| F | | | | |
| MMA | 11.8 | 20.0 | 17.0 | 1.5 |
| IBMA | — | — | — | — |
| G | 8.2 | — | 3.0 | 0.3 |
| AA | | | | |
| Polymerization data | | | | |
| Solid content | 31.5 | 31.4 | 31.0 | 31.0 |
| Viscosity | 3.4 | 3.5 | 4.2 | 4.3 |
| % Hydrophilic polymer | 75 | 75 | 75 | 97 |

TABLE 3

| Synthesis Example No. | 9 | 10 | 11 | 12 |
|---|---|---|---|---|
| Composition of charge solution | | | | |
| First step polymerization (part) | | | | |
| A | 36.0 | 35.0 | 24.0 | 24.0 |
| B | 4.0 | 5.0 | 6.0 | 6.0 |
| C | | | | |
| DMAm | — | — | — | 30.6 |
| ACMO | 38.2 | — | — | — |
| IPAm | — | 45.9 | — | — |
| HEMA | 12.8 | — | 51.0 | 20.4 |
| HEA | — | 5.1 | — | — |
| D | | | | |
| GMA | — | — | 9.0 | 9.0 |
| SEM | 9.0 | 9.0 | — | — |
| Composition of charge solution | | | | |
| Second step polymerization (part) | | | | |
| E | 15.6 | 75.6 | 114.3 | 171.0 |
| F | | | | |
| MMA | 5.7 | 19.2 | 25.2 | 43.6 |
| IBMA | — | 8.3 | 16.2 | 18.7 |
| G | 1.0 | 4.8 | 7.3 | 11.0 |
| AA | | | | |
| Polymerization data | | | | |
| Solid content | 31.0 | 30.8 | 30.5 | 30.0 |
| Viscosity | 3.9 | 3.5 | 3.3 | 3.0 |
| % Hydrophilic polymer | 90 | 65 | 55 | 45 |

TABLE 4

| Synthesis Example No. | 13 | 14 | 15 | 16 |
|---|---|---|---|---|
| Composition of charge solution | | | | |
| First step polymerization (part) | | | | |
| A | 58.0 | 58.0 | 58.0 | 58.0 |
| B | 4.0 | 4.0 | 4.0 | 4.0 |
| C | | | | |
| DMAm | — | 25.5 | — | — |
| ACMO | 31.5 | — | 38.2 | — |
| HEMA | — | 25.5 | 12.8 | 51.0 |
| HEA | 13.5 | — | — | — |
| D | | | | |
| MMA | 17.0 | 17.0 | 5.7 | 25.2 |
| IBMA | — | — | — | 16.5 |
| E | | | | |
| GMA | — | 9.0 | — | 9.0 |
| SEM | 15.0 | — | 9.0 | — |
| AA | 3.0 | 3.0 | 1.0 | 7.3 |
| Polymerization data | | | | |
| Solid content | 34.0 | 33.8 | 34.5 | 33.8 |
| Viscosity | 7.8 | 7.9 | 8.5 | 7.1 |
| Formulation of charge monomer | as in Syn. Ex. 2 | as in Syn. Ex. 3 | as in Syn. Ex. 9 | as in Syn. Ex. 11 |

TABLE 5

| Ex. No. | Polymer Syn. Ex. | Polymer Amount (part) | Solvent | Crosslinking agent Surfactant (part) | Photopolymerization initiator (part) | Base | Drying time (sec.) | Irradiation time (sec.) |
|---|---|---|---|---|---|---|---|---|
| 1 | 2 | 90 | MC | (1) 10 | (7) 0.4 | PVC | 40 | 5 |
| 2 | 3 | 90 | MC | (2) 10 | (7) 0.4 | PC | 70 | 5 |
| 3 | 3 | 40 | MC | (2) 50 (6) 10 | (7) 2.4 | PC | 60 | 15 |
| 4 | 3 | 10 | MC | (1) 40 (2) 50 | (7) 3.6 | PC | 60 | 20 |
| 5 | 4 | 70 | MC | (3) 20 (5) 10 | (7) 1.2 | PMMA | 60 | 20 |
| 6 | 4 | 60 | MC | (4) 40 | (7) 1.6 | PMMA | 60 | 28 |
| 7 | 9 | 30 | MC | (1) 50 (5) 20 | (7) 2.8 | PVC | 40 | 25 |
| 8 | 10 | 20 | MC | (2) 30 (3) 50 | (7) 3.2 | PVC | 40 | 23 |
| 9 | 11 | 10 | MC | (3) 50 (6) 40 | (7) 3.6 | PC | 60 | 20 |
| 10 | 3 | 40 | MC | (2) 50 (6) 10 (a) 7 (b) 3 | (7) 2.4 | PC | 60 | 17 |
| 11 | 3 | 30 | MC | (1) 30 (2) 40 (a) 10 (b) 4 | (7) 2.8 | PMMA | 60 | 20 |

TABLE 6

| Ex. No. | Polymer Syn. Ex. | Polymer Amount (part) | Solvent | Crosslinking agent Surfactant (part) | Photopolymerization initiator (part) | Base | Drying time (sec.) | Irradiation time (sec.) |
|---|---|---|---|---|---|---|---|---|
| 1 | 1 | 90 | MC | (1) 10 | (7) 0.4 | PVC | 40 | 5 |
| 2 | 5 | 40 | MC | (2) 50 (6) 10 | (7) 2.4 | PC | 60 | 15 |
| 3 | 7 | 70 | MC | (3) 20 (5) 10 | (7) 1.2 | PMMA | 60 | 20 |
| 4 | 8 | 30 | MC | (1) 50 (5) 20 | (7) 2.8 | PVC | 60 | 25 |
| 5 | 12 | 10 | MC | (3) 50 (6) 40 | (7) 3.6 | PC | 60 | 20 |
| 6 | 3 | 95 | MC | (2) 5 | (7) 0.2 | PVC | 40 | 5 |
| 7 | 3 | 5 | | (1) 45 (2) 50 | (7) 3.8 | PC | 60 | 23 |
| 8 | 13 | 90 | MC | (1) 10 | (7) 0.4 | PVC | 40 | 10 |
| 9 | 14 | 40 | MC | (2) 50 (6) 10 | (7) 2.4 | PC | 60 | 20 |
| 10 | 15 | 30 | MC | (1) 50 (5) 20 | (7) 2.8 | PVC | 40 | 30 |

TABLE 7

| Com. Ex. No. | Polymer Syn. Ex. | Polymer Amount (part) | Solvent | Crosslinking agent Surfactant (part) | Photopolymerization initiator (part) | Base | Drying time (sec.) | Irradiation time (sec.) |
|---|---|---|---|---|---|---|---|---|
| 11 | 16 | 10 | MC | (3) 50 (6) 40 | (7) 3.6 | PC | 60 | 25 |
| 12 | 3 | 40 | MK | (2) 50 (6) 10 | (7) 2.4 | PMMA | 60 | 15 |
| 13 | 9 | 30 | MK | (1) 50 (5) 20 | (7) 2.8 | PMMA | 60 | 25 |
| 14 | 11 | 10 | TL | (3) 50 | (7) 3.6 | PMMA | 60 | 20 |

TABLE 7-continued

| Com. Ex. No. | Polymer Syn. Ex. | Polymer Amount (part) | Solvent | Crosslinking agent Surfactant (part) | Photopolymerization initiator (part) | Base | Drying time (sec.) | Irradiation time (sec.) |
|---|---|---|---|---|---|---|---|---|
| | | | | (6) 40 | | | | |

TABLE 8

| Com. Ex. No. | Polymer Syn. Ex. | Polymer Amount (part) | Solvent | p-Toluene-sulfonic acid (part) | Surfactant (part) | Base | Curing temp. (°C.) | Curing time (min.) |
|---|---|---|---|---|---|---|---|---|
| 15 | 2 | 100 | MC | 1 | — | PC | 80 | 40 |
| 16 | 2 | 100 | MC | 1 | — | PC | 120 | 40 |
| 17 | 3 | 100 | MC | 1 | (6) 10 | PC | 120 | 10 |
| 18 | 3 | 100 | MC | 1 | (6) 10 | PC | 120 | 20 |
| 19 | 3 | 100 | MC | 1 | (6) 10 | PC | 120 | 30 |
| 20 | 3 | 100 | MC | 1 | (6) 10 | PC | 120 | 40 |

TABLE 9

| Ex. No. | Film appearance | Film strength Hardness | Film strength Water proofness | Adhesion Initial | Adhesion After dipping in water | Antifogging property Exhalation test Initial | Antifogging property Exhalation test After dipping in water |
|---|---|---|---|---|---|---|---|
| 1 | ⊚ | ○ | ○ | (a) | (a) | ⊚ | ⊚ |
| 2 | ⊚ | ○ | ○ | (a) | (a) | ⊚ | ⊚ |
| 3 | ⊚ | ○ | ○ | (a) | (a) | ⊚ | ⊚ |
| 4 | ⊚ | ○ | ○ | (a) | (a) | ⊚ | ⊚ |
| 5 | ⊚ | ○ | ○ | (a) | (a) | ⊚ | ⊚ |
| 6 | ⊚ | ○ | ○ | (a) | (a) | ⊚ | ⊚ |
| 7 | ⊚ | ○ | ○ | (a) | (a) | ⊚ | ⊚ |
| 8 | ⊚ | ○ | ○ | (a) | (a) | ⊚ | ⊚ |
| 9 | ⊚ | ○ | ○ | (a) | (a) | ⊚ | ⊚ |
| 10 | ⊚ | ○ | ○ | (a) | (a) | ⊚ | ⊚ |
| 11 | ⊚ | ○ | ○ | (a) | (a) | ⊚ | ⊚ |

TABLE 10

| Com. Ex. No. | Film appearance | Film strength Hardness | Film strength Water proofness | Exhalation test Initial | Exhalation test After dipping in water | Antifogging property Initial | Antifogging property After dipping in water |
|---|---|---|---|---|---|---|---|
| 1 | ○ | ○ | ○ | (b) | (d) | △ | △ |
| 2 | ○ | ○ | ○ | (e) | (f) | ○ | ○ |
| 3 | △ | ○ | ○ | (a) | (a) | ⊚ | ⊚ |
| 4 | ○ | x | x | (g) | (h) | ⊚ | ⊚ |
| 5 | ○ | ○ | ○ | (a) | (a) | x | △ |
| 6 | ○ | x | x | (c) | (d) | ○ | ○ |
| 7 | ○ | ○ | ○ | (k) | (l) | ○ | ○ |
| 8 | ○ | x | x | (k) | (l) | x | △ |
| 9 | ○ | x | x | (k) | (l) | x | △ |
| 10 | ○ | x | x | (j) | (l) | x | △ |
| 11 | ○ | x | x | (i) | (l) | x | △ |
| 12 | ○ | ○ | ○ | (d) | (f) | △ | △ |
| 13 | △ | ○ | ○ | (d) | (f) | ○ | △ |
| 14 | ○ | ○ | ○ | (c) | (e) | △ | △ |

TABLE 11

| Com. Ex. No. | Film appearance | Film strength Hardness | Film strength Water proofness | Exhalation test Initial | Exhalation test After dipping in water | Antifogging property Initial | Antifogging property After dipping in water |
|---|---|---|---|---|---|---|---|
| 15 | ⊚ | x | x (dissolved) | (a) | unmeasurable (dissolved) | ⊚ | unmeasurable (dissolved) |
| 16 | ⊚ | ○ | ○ | (a) | (a) | △ | ○ |
| 17 | ⊚ | x | x (dissolved) | (a) | Unmeasurable (dissolved) | ⊚ | Unmeasurable (dissolved) |
| 18 | ⊚ | x | x (swollen) | (a) | Unmeasurable (swollen) | ⊚ | Unmeasurable (swollen) |
| 19 | ⊚ | x | x (whitened) | (a) | (a) | ⊚ | ○ |
| 20 | ⊚ | ○ | x (slightly | (a) | (a) | ○ | ○ |

TABLE 11-continued

| Com. Ex. No. | Film strength Film appearance | Adhesion | | Exhalation test | | Antifogging property | |
|---|---|---|---|---|---|---|---|
| | | Hardness | Water proofness | Initial | After dipping in water | Initial | After dipping in water |
| | | | whitened) | | | | |

TABLE 12

| Ex. No. | Polymer Syn. Ex. | Amount (part) | Solvent | Crosslinking agent Surfactant (part) | Photopolymerization initiator (part) | Base | Drying time (sec.) | Irradiation time (sec.) |
|---|---|---|---|---|---|---|---|---|
| 12 | 2 | 10 | MC | (1) 60 (2) 30 (a) 10 | (1) 3.6 | PC | 60 | 15 |
| 13 | 2 | 20 | MC | (1) 60 (3) 20 (b) 10 | (1) 3.4 | PC | 60 | 15 |
| 14 | 3 | 30 | MC | (1) 60 (2) 10 (a) 7 (c) 3 | (1) 2.8 | PMMA | 60 | 15 |
| 15 | 3 | 40 | MC | (1) 60 (a) 5 (c) 5 | (1) 2.4 | PMMA | 60 | 10 |
| 16 | 4 | 50 | MC | (2) 30 (3) 20 (b) 7 (c) 3 | (1) 2.0 | PVC | 40 | 10 |
| 17 | 4 | 60 | MC | (1) 10 (2) 30 (b) 5 (d) 5 | (1) 1.6 | PC | 60 | 10 |
| 18 | 9 | 70 | MC | (3) 30 (a) 5 (d) 5 | (1) 1.2 | PVC | 40 | 5 |
| 19 | 10 | 80 | MC | (2) 20 (b) 5 (c) 5 | (1) 0.8 | PVC | 40 | 5 |
| 20 | 11 | 90 | MC | (1) 10 (b) 7 (d) 3 | (1) 0.4 | PVC | 40 | 5 |
| 21 | 3 | 40 | MC | (1) 60 (a) 0.5 | (1) 2.4 | PMMA | 60 | 7 |

TABLE 13

| Ex. No. | Polymer Syn. Ex. | Amount (part) | Solvent | Crosslinking agent Surfactant (part) | Photopolymerization initiator (part) | Base | Drying time (sec.) | Irradiation time (sec.) |
|---|---|---|---|---|---|---|---|---|
| 22 | 3 | 40 | MC | (1) 60 (a) 5 (b) 5 (c) 5 | (1) 2.4 | PC | 60 | 15 |
| 23 | 3 | 40 | MC | (1) 60 (a) 15 (b) 10 (c) 5 | (1) 2.4 | PC | 60 | 20 |
| 24 | 3 | 40 | MC | (1) 45 (5) 15 (a) 7 (c) 3 | (1) 2.4 | PC | 60 | 12 |
| 25 | 3 | 40 | MC | (1) 30 (5) 30 (a) 7 (c) 3 | (1) 2.4 | PC | 60 | 15 |
| 26 | 3 | 40 | MC | (1) 30 (4) 10 (6) 10 (7) 10 (a) 7 (c) 3 | (1) 0.24 | PMMA | 60 | 17 |
| 27 | 3 | 40 | MC | (1) 30 (5) 10 (8) 10 (9) 10 (a) 7 (c) 3 | (1) 0.24 | PMMA | 60 | 17 |
| 28 | 3 | 40 | MC | (1) 15 (5) 45 (a) 7 (c) 3 | (1) 0.24 | PMMA | 60 | 17 |
| 29 | 3 | 40 | MC | (1) 3 (5) 57 (a) 7 (c) 3 | (1) 0.24 | PMMA | 60 | 20 |

TABLE 14

| Com. Ex. No. | Polymer Syn. Ex. | Amount (part) | Solvent | Crosslinking agent Surfactant (part) | Photopolymerization initiator (part) | Base | Drying time (sec.) | Irradiation time (sec.) |
|---|---|---|---|---|---|---|---|---|
| 21 | 1 | 10 | MC | (1) 60 (2) 30 (a) 10 | (1) 3.6 | PC | 60 | 15 |
| 22 | 5 | 30 | MC | (1) 60 (2) 10 (a) 7 (c) 3 | (1) 2.8 | PMMA | 60 | 15 |
| 23 | 6 | 40 | MC | (1) 60 (a) 5 (c) 5 | (1) 2.4 | PMMA | 60 | 10 |
| 24 | 7 | 50 | MC | (2) 30 (3) 20 (b) 7 (c) 3 | (1) 2.0 | PVC | 40 | 10 |
| 25 | 8 | 70 | MC | (3) 30 (a) 5 (d) 5 | (1) 1.2 | PVC | 40 | 5 |
| 26 | 12 | 90 | MC | (1) 10 (b) 7 (d) 3 | (1) 0.4 | PVC | 40 | 5 |
| 27 | 2 | 5 | MC | (1) 60 (2) 30 (3) 5 (a) 10 | (1) 3.8 | PC | 60 | 17 |
| 28 | 11 | 95 | MC | (1) 5 (b) 7 (d) 3 | (1) 0.2 | PVC | 40 | 3 |
| 29 | 4 | 50 | MC | (2) 30 (3) 20 (b) 0.3 (c) 0.1 | (1) 2.0 | PVC | 40 | 9 |
| 30 | 4 | 50 | MC | (2) 30 (3) 20 (b) 24.5 (c) 10.5 | (1) 2.0 | PVC | 40 | 15 |

TABLE 15

| Com. Ex. No. | Polymer Syn. Ex. | Amount (part) | Solvent | Crosslinking agent Surfactant (part) | Photopolymerization initiator (part) | Base | Drying time (sec.) | Irradiation time (sec.) |
|---|---|---|---|---|---|---|---|---|
| 31 | 13 | 20 | MC | (1) 60 (3) 20 (b) 10 | (1) 3.4 | PC | 60 | 20 |
| 32 | 14 | 30 | MC | (1) 60 (2) 10 (a) 7 (c) 3 | (1) 2.8 | PMMA | 60 | 20 |
| 33 | 15 | 70 | MC | (3) 30 (a) 5 (d) 5 | (1) 1.2 | PVC | 40 | 10 |
| 34 | 16 | 90 | MC | (1) 10 (b) 7 (d) 3 | (1) 0.4 | PVC | 40 | 10 |
| 35 | 3 | 40 | MK | (1) 60 (a) 5 (c) 5 | (1) 2.4 | PMMA | 60 | 10 |
| 36 | 9 | 70 | MK | (3) 30 (a) 5 (d) 5 | (1) 1.2 | PVC | 40 | 5 |
| 37 | 11 | 90 | TL | (1) 10 (b) 7 (d) 3 | (1) 0.4 | PVC | 40 | 5 |

TABLE 16

| Ex. No. | Film Appearance | Film strength Hardness | Fastness (1) | Fastness (2) | Water Proofness | Adhesion Initial | Adhesion After immersion | Antifogging property Exhalation test | Steam test | After immersion |
|---|---|---|---|---|---|---|---|---|---|---|
| 12 | ◉ | ○ | ◉ | ◉ | ○ | (a) | (a) | ◉ | (1) | ◉ |
| 13 | ◉ | ○ | ◉ | ◉ | ○ | (a) | (a) | ◉ | (1) | ◉ |
| 14 | ◉ | ○ | ◉ | ◉ | ○ | (a) | (a) | ◉ | (1) | ◉ |
| 15 | ◉ | ○ | ◉ | ◉ | ○ | (a) | (a) | ◉ | (1) | ◉ |
| 16 | ◉ | ○ | ◉ | ◉ | ○ | (a) | (a) | ◉ | (1) | ◉ |
| 17 | ◉ | ○ | ◉ | ◉ | ○ | (a) | (a) | ◉ | (1) | ◉ |
| 18 | ◉ | ○ | ◉ | ◉ | ○ | (a) | (a) | ◉ | (1) | ◉ |
| 19 | ◉ | ○ | ◉ | ◉ | ○ | (a) | (a) | ◉ | (1) | ◉ |
| 20 | ◉ | ○ | ◉ | ○ | ○ | (a) | (a) | ◉ | (1) | ◉ |
| 21 | ◉ | ○ | ◉ | ◉ | ○ | (a) | (a) | ◉ | (2) | ○ |

TABLE 17

| Ex. No. | Film Appearance | Film strength Hardness | Fastness (1) | Fastness (2) | Water Proofness | Adhesion Initial | Adhesion After immersion | Antifogging property Exhalation test | Antifogging property Steam test | Antifogging property After immersion |
|---|---|---|---|---|---|---|---|---|---|---|
| 22 | ⊙ | ○ | ⊙ | ⊙ | ○ | (a) | (a) | ⊙ | (1) | ⊙ |
| 23 | ⊙ | ○ | ⊙ | ⊙ | ○ | (a) | (a) | ⊙ | (1) | ⊙ |
| 24 | ⊙ | ○ | ⊙ | ⊙ | ○ | (a) | (a) | ⊙ | (1) | ⊙ |
| 25 | ⊙ | ○ | ⊙ | ⊙ | ○ | (a) | (a) | ⊙ | (1) | ⊙ |
| 26 | ⊙ | ○ | ⊙ | ⊙ | ○ | (a) | (a) | ⊙ | (1) | ⊙ |
| 27 | ⊙ | ○ | ⊙ | ⊙ | ○ | (a) | (a) | ⊙ | (1) | ⊙ |
| 28 | ⊙ | ○ | ⊙ | ⊙ | ○ | (a) | (a) | ⊙ | (1) | ⊙ |
| 29 | ⊙ | ○ | ⊙ | ○ | ○ | (a) | (a) | ⊙ | (1) | ⊙ |

TABLE 18

| Com. Ex. No. | Film Appearance | Hardness | Fastness (1) | Fastness (2) | Water Proofness | Adhesion Initial | Adhesion After immersion | Exhalation test | Steam test | After immersion |
|---|---|---|---|---|---|---|---|---|---|---|
| 21 | ○ | ○ | ○ | ○ | ○ | (b) | (d) | △ | (4) | △ |
| 22 | ○ | ○ | ○ | ○ | ○ | (f) | (h) | ○ | (1) | ○ |
| 23 | △ | ○ | ○ | ○ | ○ | (f) | (h) | ○ | (1) | ○ |
| 24 | x | ○ | ○ | ○ | x | (a) | (a) | ○ | (1) | ○ |
| 25 | ○ | x | △ | x | x | (i) | (n) | ○ | (1) | ○ |
| 26 | ○ | ○ | ○ | ○ | ○ | (a) | (a) | △ | (5) | x |
| 27 | ○ | ○ | ○ | ○ | ○ | (j) | (n) | △ | (4) | △ |
| 28 | ○ | x | x | x | x | (a) | (a) | ○ | (1) | ○ |
| 29 | ○ | ○ | ⊙ | ⊙ | ○ | (a) | (a) | △ | (5) | x |
| 30 | ○ | x | △ | △ | ○ | (b) | (b) | ⊙ | (1) | ⊙ |

TABLE 19

| Com. Ex. No. | Film Appearance | Hardness | Fastness (1) | Fastness (2) | Water Proofness | Adhesion Initial | Adhesion After immersion | Exhalation test | Steam test | After immersion |
|---|---|---|---|---|---|---|---|---|---|---|
| 31 | x | x | ○ | △ | x | (l) | (n) | △ | (6) | x |
| 32 | x | x | ○ | △ | x | (k) | (n) | △ | (6) | x |
| 33 | x | x | x | x | x | (m) | (n) | ○ | (5) | △ |
| 34 | x | x | x | x | x | (j) | (n) | x | (6) | x |
| 35 | ○ | ○ | ⊙ | ⊙ | ○ | (d) | (g) | △ | (4) | △ |
| 36 | ○ | ○ | ⊙ | ⊙ | ○ | (c) | (f) | ○ | (3) | ○ |
| 37 | ○ | ○ | ⊙ | ⊙ | ○ | (c) | (e) | △ | (4) | △ |

TABLE 20

| Ex./Com. Ex. No. | Polymer Syn. Ex. | Polymer Amount (part) | Solvent | Crosslinking Agent Surfactant (part) | Photopolymerization initiator (part) | Base | Drying time (sec.) | Irradiation time (sec.) |
|---|---|---|---|---|---|---|---|---|
| Example | | | | | | | | |
| 30 | 2 | 20 | MC | (1) 60 (4) 20 (b) 10 | (1) 3.4 | PC | 60 | 15 |
| 31 | 2 | 20 | MC | (1) 60 (4) 20 (b) 6 (e) 4 | (1) 3.4 | PC | 60 | 15 |
| 32 | 2 | 20 | MC | (1) 60 (4) 20 (b) 8.5 (g) 1.5 | (1) 3.4 | PC | 60 | 15 |
| 33 | 3 | 40 | MC | (1) 30 (5) 30 (a) 7 (c) 3 | (1) 2.4 | PC | 60 | 12 |
| 34 | 3 | 40 | MC | (1) 30 (5) 30 (a) 3 (f) 7 | (1) 2.4 | PC | 60 | 12 |
| 35 | 3 | 40 | MC | (1) 30 (5) 30 (a) 3 (c) 3 (h) 5 | (1) 2.4 | PC | 60 | 12 |
| 36 | 11 | 60 | MC | (1) 40 (b) 7 (d) 3 | (1) 0.4 | PVC | 40 | 20 |
| 37 | 11 | 60 | MC | (1) 30 (b) 7 (d) 3 (g) 4 | (1) 0.4 | PVC | 40 | 20 |
| Comparative | | | | | | | | |
| 38 | 13 | 20 | MC | (1) 60 (4) 20 | (1) 3.4 | PC | 60 | 15 |

TABLE 20-continued

| Ex./Com. Ex. No. | Polymer Syn. Ex. | Polymer Amount (part) | Solvent | Crosslinking Agent Surfactant (part) | Photopolymerization initiator (part) | Base | Drying time (sec.) | Irradiation time (sec.) |
|---|---|---|---|---|---|---|---|---|
| 39 | 14 | 40 | MC | (b) 6 (e) 4 (1) 30 (5) 30 | (1) 2.4 | PC | 60 | 12 |
| 40 | 16 | 60 | MC | (a) 3 (f) 7 (1) 40 (b) 7 (d) 3 (g) 4 | (1) 0.4 | PVC | 40 | 20 |

TABLE 21

| Ex./Com. Ex. No. | Film Appearance | Film strength Hardness Initial | Film strength Hardness after imm. | Film strength Fastness (1) | Film strength Fastness (2) | Film strength Water Proofness | Adhesion Initial | Adhesion After immersion | Antifogging property Exhalation test | Antifogging property Steam test | Antifogging property After immersion |
|---|---|---|---|---|---|---|---|---|---|---|---|
| Example | | | | | | | | | | | |
| 30 | ⊚ | ○ | ○ | ⊚ ⊚ | | ○ | (a) | (a) | ⊚ | △ | ⊚ |
| 31 | ⊚ | ○ | ○ | ⊚ ⊚ | | ○ | (a) | (a) | ⊚ | ⊚ | ⊚ |
| 32 | ⊚ | ○ | ○ | ⊚ ⊚ | | ○ | (a) | (a) | ⊚ | ⊚ | ⊚ |
| 33 | ⊚ | ○ | x | ⊚ ⊚ | | ○ | (a) | (a) | ⊚ | ○ | ○ |
| 34 | ○ | ○ | x | ⊚ ⊚ | | ○ | (a) | (a) | ⊚ | ⊚ | ⊚ |
| 35 | ○ | ○ | x | ⊚ ⊚ | | ○ | (a) | (a) | ⊚ | ⊚ | ⊚ |
| 36 | ⊚ | ○ | ○ | ⊚ ⊚ | | ○ | (a) | (a) | ⊚ | ○ | ⊚ |
| 37 | ⊚ | ○ | ○ | ⊚ ⊚ | | ○ | (a) | (a) | ⊚ | ⊚ | ⊚ |
| Comparative | | | | | | | | | | | |
| 38 | x | x | x | ○ △ | | x | (1) | (n) | △ | x | x |
| 39 | x | x | x | ○ △ | | x | (1) | (n) | △ | x | x |
| 40 | x | x | x | ○ △ | | x | (m) | (n) | △ | x | x |

What is claimed is:

1. A composition of ultraviolet curing antifogging agent for a coating film having a combination of antifogging property, high strength and adhesion ability, comprising:

a block copolymer (a) having a hydrophilic polymer segment (a1) providing transparency to said film and a hydrophobic polymer segment (a2) providing transparency and strength to said film;

a photopolymerizable compound (b), the weight ratio of the block copolymer (a) to the photopolymerizable component (b) being in the range of 10/90 to 90/10 in terms of solid content;

an alcohol ether series polar solvent (c);

a photopolymerization initiator (d) comprising at least one compound selected from the group consisting of acetophenones, aromatic ketone and benzil ketal;

a fluorine containing surfactant producing high bridging density, high strength and enhanced smoothness for said coating film with said surfactant being disposed adjacent the film surface after ultraviolet curing (e); and wherein the hydrophilic polymer segment (a1) of the block copolymer contains, A) 70 to 99% by weight of at least one hydrophilic monomer selected from the group consisting of, i) a (meth)acrylamide compound represented by the general formula (I):

$$CH_2=CR_1CONR_2R_3 \quad (I)$$

wherein $R_1$ represents a hydrogen atom or a methyl group; $R_2$ represents a hydrogen atom or a linear or branched $C_nH_{2n+1}$; $R_3$ represents a hydrogen atom, a linear or branched $C_nH_{2n+1}$, N,N-dimethylaminopropyl group or $-C(CH_3)_2CH_2COCH_3$; and n is an integer in the range of 1 to 4, ii) a cyclic (meth)acrylamide compound represented by the general formula (II):

(II)

wherein $R_1$ represents a hydrogen atom or a methyl group; and A represents $-(CH_2)_4-$, $-(CH_2)_5-$ or $-(CH_2)_2-O-(CH_2)_2-$, and iii) a hydroxyalkyl (meth)acrylate, and B, 1 to 30% by weight of at least one radically polymerizable monomer having a functional group selected from the group consisting of a glycidyl group, an amino group, a carboxyl group, a sulfonic group and an acid anhydride group; and wherein the hydrophobic polymer segment (a2) contains 1 to 3% by weight of a monomer selected from said radically polymerizable monomers and 70 to 99% by weight of at least one hydrophobic monomer which is copolymerizable with said radically polymerizable monomers to produce said coating film having said transparency and strength; the weight ratio of the hydrophilic polymer segment (a1) to the hydrophobic polymer segment (a2) being in the range of 50/50 to 95/5; and wherein said photopolymerizable compound (b) provides high strength and antifogging properties for said film and is chosen from the group consisting of a compound represented by the general formula (III):

$$CH_2=CR_1COO(CH_2CR_4HO)_nOCCR_1=CH_2 \quad (III)$$

wherein $R_1$ and $R_4$ each represent a hydrogen atom or a methyl group; and n is an integer in the range of 1 to 30, and a compound represented by the general formula (IV):

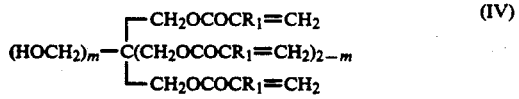

wherein $R_1$ represents a hydrogen atom or a methyl group, and m is an integer in the range of 0 to 2.

2. A composition of antifogging agent according to claim 1 wherein the photopolymerizable compound (b) is a mixture including both a compound represented by general formula (III) and a compound represented by general formula (IV).

3. A composition of antifogging agent according to claim 1 wherein the fluorine containing surfactant is a material selected from the group consisting of a nonionic and a anionic surfactant.

4. A composition of antifogging agent according to claim 1, wherein the fluorine containing surfactant (e) is a mixture including both a fluorine containing surfactant and a fluorine free surfactant.

5. A composition of antifogging agent according to claim 1, wherein the weight ratio of the block copolymer (a) to the photopolymerizable compound (b) to the surfactant (e) is 100:10 to 900:0.5 to 300 in terms of the solid content.

* * * * *

UNITED STATES PATENT AND TRADEMARK OFFICE
CERTIFICATE OF CORRECTION

PATENT NO. : 5,244,935

DATED : September 14, 1993

INVENTOR(S) : Yoshihiro Oshibe et al.

It is certified that error appears in the above-identified patent and that said Letters Patent is hereby corrected as shown below:

Column 2, Line 16, after the word "composition" insert a paragraph;

Column 4, Line 21, cancel "wheres" and insert -- whereas --;

Column 8, Line 5, cancel "$C_pF_{2p+1}C_4O\ (C_2H_4O)_qH$" and insert -- $C_pF_{2p+1}C_2H_4O\ (C_2H_4O)_qH$ --;

Column 8, Line 49, cancel "x" and insert -- X --;

Column 11, Line 19, cancel "C.nfor" and insert -- C for --;

Column 11, Line 27, cancel "C.nwith" and insert -- C with --;

Column 11, Line 63, cancel "11st" and insert -- 11 --;

Column 12, Line 67, after "appearance" insert a paragraph;

Column 13, Line 28, cancel "C.nhot" and insert -- C hot --;

Column 13, Line 31, after "appearance" cancel the comma (,);

UNITED STATES PATENT AND TRADEMARK OFFICE
CERTIFICATE OF CORRECTION

PATENT NO. : 5,244,935

DATED : September 14, 1993

INVENTOR(S) : Yoshihiro Oshibe et al.

It is certified that error appears in the above-identified patent and that said Letters Patent is hereby corrected as shown below:

| | |
|---|---|
| Column 18, Line 1, | cancel "toin" and insert -- tion --; |
| Column 18, Line 57, | cancel "perflouroalkylsulfonic" and insert -- perfluoroalkylsulfonic --; |
| Column 19, Line 51, | before "Although" insert a paragraph; |
| Column 20, Lines 37-38: | cancel "G  8.2 - 3.0 0.3<br>    AA"<br>and insert --<br>G  AA  8.2  - 3.0  0.3 --; |
| Column 20, Line 48, | cancel "24.0 24.0" and insert -- 34.0 34.0 --; |
| Column 20, Lines 63-64; | cancel "G  1.0  4.8  7.3  11.0<br>    AA"<br>and insert --<br>G AA  1.0  4.8  7.3  11.0 --; |

UNITED STATES PATENT AND TRADEMARK OFFICE
CERTIFICATE OF CORRECTION

PATENT NO. : 5,244,935

DATED : September 14, 1993

INVENTOR(S) : Yoshihiro Oshibe et al.

Page 3 of 4

It is certified that error appears in the above-identified patent and that said Letters Patent is hereby corrected as shown below:

Column 23-24, Table 10, cancel

"| Com. | | Film Strength | | Adhesion | | Exhalation test | Antifogging property |
|---|---|---|---|---|---|---|---|
| Ex. No. | Film appearance | Hardness | Water Proofness | Initial | After dipping in water | initial | After dipping in water"

and insert --

| Com. | Film | Film Hardness | Strength Water proofness | Adhesion | After dipping | Antifogging Property Exhalation test | After dipping |
|---|---|---|---|---|---|---|---|
| Ex. No. | Appearance | | | Initial | in water | Initial | in water--;

Column 23-24, Table 11, cancel

"| Com. | | Film Strength | | Adhesion | | Exhalation test | Antifogging property |
|---|---|---|---|---|---|---|---|
| Ex. No. | Film appearance | Hardness | Water Proofness | Initial | After dipping in water | Initial | After dipping in water"

and insert --

| Com. | Film | Film Hardness | Strength Water proofness | Adhesion | After dipping | Antifogging Property Exhalation test | After dipping |
|---|---|---|---|---|---|---|---|
| Ex. No. | Appearance | | | Initial | in water | Initial | in water--;

Column 25-26, Table 11, cancel

"| Com. | | Film Strength | | Adhesion | | Exhalation test | Antifogging property |
|---|---|---|---|---|---|---|---|
| Ex. No. | Film appearance | Hardness | Water Proofness | Initial | After dipping in water | Initial | After dipping in water"

and insert --

| Com. | Film | Film Hardness | Strength Water proofness | Adhesion | After dipping | Antifogging Property Exhalation test | After dipping |
|---|---|---|---|---|---|---|---|
| Ex. No. | Appearance | | | Initial | in water | Initial | in water--;

UNITED STATES PATENT AND TRADEMARK OFFICE
CERTIFICATE OF CORRECTION

PATENT NO. : 5,244,935
DATED : September 14, 1993
INVENTOR(S) : Yoshihiro Oshibe et al.

It is certified that error appears in the above-indentified patent and that said Letters Patent is hereby corrected as shown below:

Column 32, Line 54, cancel "3%" and insert -- 30% --.

Signed and Sealed this

Nineteenth Day of April, 1994

Attest:

BRUCE LEHMAN

Attesting Officer

Commissioner of Patents and Trademarks